United States Patent
Morgenstern et al.

(10) Patent No.: US 7,311,287 B2
(45) Date of Patent: Dec. 25, 2007

(54) METHODS FOR INCORPORATING AREA RULED SURFACES IN A SUPERSONIC AIRCRAFT

(75) Inventors: John M. Morgenstern, Lancaster, CA (US); Alan E. Arslan, Santa Clarita, CA (US); Garret A. Moose, Palmdale, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 180 days.

(21) Appl. No.: 11/078,632

(22) Filed: Mar. 11, 2005

(65) Prior Publication Data

US 2005/0224640 A1    Oct. 13, 2005

Related U.S. Application Data

(63) Continuation-in-part of application No. 10/706,670, filed on Nov. 11, 2003, now abandoned.

(51) Int. Cl.
*B64C 1/00* (2006.01)
(52) U.S. Cl. .................. 244/119; 244/120; 244/123; 244/130; 244/1 R; 703/8
(58) Field of Classification Search ............... 244/119, 244/120, 123, 130, 1 R; 703/8
See application file for complete search history.

(56) References Cited

U.S. PATENT DOCUMENTS

| | | | | |
|---|---|---|---|---|
| 3,737,121 A | * | 6/1973 | Jones | 244/13 |
| 4,053,125 A | * | 10/1977 | Ratony | 244/46 |
| 4,327,884 A | * | 5/1982 | Lawhorn | 244/3.1 |
| 4,365,773 A | * | 12/1982 | Wolkovitch | 244/45 R |
| 4,390,150 A | * | 6/1983 | Whitener | 244/45 R |
| 4,828,204 A | * | 5/1989 | Friebel | 244/15 |
| 4,976,396 A | * | 12/1990 | Carlson et al. | 244/55 |
| 5,115,999 A | * | 5/1992 | Buchsel et al. | 244/118.5 |
| 5,692,704 A | * | 12/1997 | Buttgereit et al. | 244/119 |
| 5,772,156 A | * | 6/1998 | Parikh et al. | 244/209 |
| 5,897,076 A | * | 4/1999 | Tracy | 244/117 A |
| D417,184 S | * | 11/1999 | Hartmann et al. | D12/333 |
| 6,149,101 A | * | 11/2000 | Tracy | 244/130 |
| 6,273,363 B1 | * | 8/2001 | Sprenger | 244/13 |
| 6,575,406 B2 | * | 6/2003 | Nelson | 244/119 |

(Continued)

OTHER PUBLICATIONS

"Computer-aided design." Wikipedia, The Free Encyclopedia. May 18, 2007, 17:23 UTC. Wikimedia Foundation, Inc. May 21, 2007 <http://en.wikipedia.org/w/index.php?title=Computer-aided_design&oldid=131815698>.*

(Continued)

*Primary Examiner*—J. Woodrow Eldred (57) ABSTRACT

A vertical stabilizer is configured to minimize the rate of change of cross-sectional area distribution of the vehicle or device to which the vertical stabilizer is mounted. One or more "waisted" areas can be included at the tip and/or the root of the vertical stabilizers, as well as over the distance from tip to root of the vertical stabilizer. In some situations, a strake is mounted on the vehicle or device, such as an aircraft, and the vertical stabilizer is mounted to the tip of the strake. The strake can also be area ruled with one or more "waisted" sections at the juncture of the vertical stabilizer. Applying area ruling to the vertical stabilizer helps to further reduce the drag of the vehicle or device.

11 Claims, 8 Drawing Sheets

U.S. PATENT DOCUMENTS

| | | | |
|---|---|---|---|
| 6,705,567 B2* | 3/2004 | Dong et al. | 244/13 |
| 6,729,577 B2* | 5/2004 | Morgenstern | 244/45 R |
| 6,942,178 B2* | 9/2005 | Morgenstern et al. | 244/35 A |
| 6,959,896 B2* | 11/2005 | Hartmann et al. | 244/35 A |
| 2002/0096598 A1* | 7/2002 | Nelson | 244/15 |
| 2003/0213870 A1* | 11/2003 | Eakins et al. | 244/119 |
| 2004/0007647 A1* | 1/2004 | Dong et al. | 244/165 |
| 2004/0016845 A1* | 1/2004 | Nelson | 244/45 A |
| 2004/0069903 A1* | 4/2004 | Retz et al. | 244/119 |
| 2004/0245380 A9* | 12/2004 | Hartmann et al. | 244/36 |
| 2005/0061916 A1* | 3/2005 | Sankrithi | 244/119 |
| 2005/0116107 A1* | 6/2005 | Morgenstern et al. | 244/130 |
| 2005/0116108 A1* | 6/2005 | Morgenstern et al. | 244/130 |
| 2005/0121555 A1* | 6/2005 | Morgenstern et al. | 244/130 |
| 2005/0218267 A1* | 10/2005 | Makino | 244/130 |
| 2005/0230531 A1* | 10/2005 | Horinouchi | 244/47 |

OTHER PUBLICATIONS

"Area rule." Wikipedia, The Free Encyclopedia. May 13, 2007, 03:46 UTC. Wikimedia Foundation, Inc. May 21, 2007 <http://en.wikipedia.org/w/index.php?title=Area_rule&oldid=130466436>.*

"Computational fluid dynamics." Wikipedia, The Free Encyclopedia. May 10, 2007, 19:01 UTC. Wikimedia Foundation, Inc. May 21, 2007 <http://en.wikipedia.org/w/index.php?title=Computational_fluid_dynamics&oldid=129895282>.*

* cited by examiner

METHODS FOR INCORPORATING AREA RULED SURFACES IN A SUPERSONIC AIRCRAFT

BACKGROUND OF THE INVENTION

The area rule is an important concept related to the drag on an aircraft or other body in transonic and supersonic flight. The area rule was developed in the early 1950s when production fighter designs began pushing ever closer to the sound barrier. Designers had found that the drag on these aircraft increased substantially when the planes traveled near Mach 1, a phenomenon known as the transonic drag rise. The increase in drag is due to the formation of shock waves over portions of the vehicle, which typically begins around Mach 0.8. The drag increase reaches a maximum near Mach 1. Because the drag results from the shock waves, this type of drag is referred to as wave drag.

Since the physics of supersonic flight were still largely a mystery to manufacturers, designers had no idea how to address this problem except to provide their aircraft with more powerful engines. Even though jet engine technology was rapidly advancing in those days, the first generation of jet-powered fighters was hampered by relatively low-thrust engines which limited them to subsonic flight. The US Air Force hoped to overcome this deficiency with its first dedicated supersonic fighter, the F-102 Delta Dagger.

Since the transonic drag rise was still not fully understood, the F-102's designers chose an engine they believed would provide enough thrust to reach a maximum speed of about Mach 1.2. However, initial flight tests of the YF-102 prototype indicated that the aircraft could not reach Mach 1. The aircraft's designers did not understand this lack of performance until a NACA researcher named Dr. Richard Whitcomb developed the area rule.

Whitcomb experimented with several different axisymmetric bodies and wing-body combinations in a transonic wind-tunnel. He discovered that the drag created on these shapes was directly related to the change in cross-sectional area of the vehicle from the nose to the tail. The shape itself was not as critical in the creation of drag, but the rate of change in that shape had the most significant effect. Stated differently, the wave drag is related to the second-derivative (or curvature) of the volume distribution of the vehicle.

To illustrate the point, Whitcomb's experimental models included (1) a simple cylindrical fuselage, (2) a cylindrical fuselage with wings attached, (3) a bulged fuselage, and (4) a "wasp-waisted" fuselage with wings. The addition of wings to the basic cylinder produced twice as much drag as the cylinder alone. Additionally, the drag rose by the same amount if a simple bulge were added to the cylinder, the bulge having equivalent volume to the wings. However, if the cross-sectional area of the fuselage was reduced over the region where the wings were attached, the total drag was about the same as that of the cylinder alone.

The conclusion of this research was that the drag on an aircraft could be drastically reduced by shaping the vehicle to create a smooth cross-sectional area distribution from the nose to the tail. The area rule dictates that the volume of the body should be reduced in the presence of a wing, tail surface, or other projection so that there are no discontinuities in the cross-sectional area distribution of the vehicle shape.

Whitcomb's findings are related to a more theoretical concept called the Sears-Haack body. This shape yields the lowest possible wave drag for a given length and volume. The variation in cross-sectional area for a Sears-Haack body results in minimized wave drag when the curvature of the volume distribution is minimized. The closer the volume distribution of an aircraft or other high-speed vehicle comes to the ideal Sears-Haack body, the lower its wave drag will be.

The area rule has found greater application to subsonic aircraft, particularly commercial airliners since they cruise at the lower end of the transonic regime. A good example is the Boeing 747, known for its distinctive "hump." This hump, which houses the cockpit and upper passenger deck, increases the cross-sectional area of the forward fuselage and has the effect of evening the volume distribution over the length of the aircraft. As a result, the 747 is able to cruise efficiently at a slightly higher speed than most other airliners since the increase in transonic wave drag is delayed. It is very difficult, however, to achieve realistic vehicle configurations that completely meet the ideal Sears-Haack body.

SUMMARY OF THE INVENTION

The goal is to find new ways to apply the area rule, which is a method to achieve vehicle configurations that meet the ideal Sears-Haack minimum wave drag body for a given mach number, to the design of a vertical tail of a supersonic aircraft configuration.

In accordance with some embodiments, a vertical stabilizer is configured to minimize the rate of change of cross-sectional area distribution of a vehicle or device to which the vertical stabilizer is mounted. One or more "waisted" areas can be included at the tip and/or the root of the vertical stabilizer. In some embodiments, a strake is mounted on the vehicle or device, such as an aircraft, and the vertical stabilizer is mounted to the tip of the strake. The strake can also be area ruled with one or more "waisted" sections at the juncture of the vertical stabilizer. The strake may also be called dorsal.

According to other embodiments, an aircraft design system comprises logic instructions operable to apply area ruling theory to the tail section of the aircraft, including configuring a vertical fin with at least one "waisted" area to minimize the overall rate of change of cross-sectional area distribution of the aircraft.

In some embodiments, a number of vertical stabilizer configurations can be optimized for minimum drag at different Mach numbers. The configurations can be weighted according to selected criteria, and the average of the weighted configurations can be taken as a final configuration. The weighting factors can be based on any suitable constraint(s) or criteria. For example, for an aircraft, the weighting factors can be based on percent of typical flight profile spent at each Mach number, minimum drag, the difference between thrust available and thrust required (referred to as pinch-point), and/or minimum sonic boom. Applying area ruling to the vertical stabilizer helps to further reduce the wave drag of the vehicle or device to operate efficiently over expected operating conditions, low boom climb and cruise, high speed cruise, and landing of an aircraft.

BRIEF DESCRIPTION OF THE DRAWINGS

Embodiments of the invention relating to both structure and method of operation, may best be understood by referring to the following description and accompanying drawings.

DETAILED DESCRIPTION OF THE EMBODIMENTS

Referring to FIGS. 1A through 1D, FIG. 1A is a top view of an embodiment of a rear portion of aircraft 100 including vertical fin 102 extending from strake 104, rear fuselage portion 106, inverted V-tail 108, and wings 110. While both the tip and root of vertical fin 102 are shown shaped according to area ruling concepts, in some embodiments, either the tip or root, but not both, of vertical fin 102 can be area ruled. Additionally, the area ruled shape of vertical fin 102 and strake 104 can include more than one "wasp-waist," or reduced cross-sectional areas. Applying area ruling to aircraft 100, including vertical fin 102 and strake 104, helps reduce wave drag by reducing the rate of change in the aircraft's overall cross-sectional area distribution, and minimizing the maximum cross-sectional area of the aircraft. Additionally, reducing the volume in the fuselage 106 in the vicinity of vertical fin 102, strake 104, inverted V-tail 108, and wings 110 facilitates application of area ruling as well as reducing sonic boom disturbance.

Figure 1A:
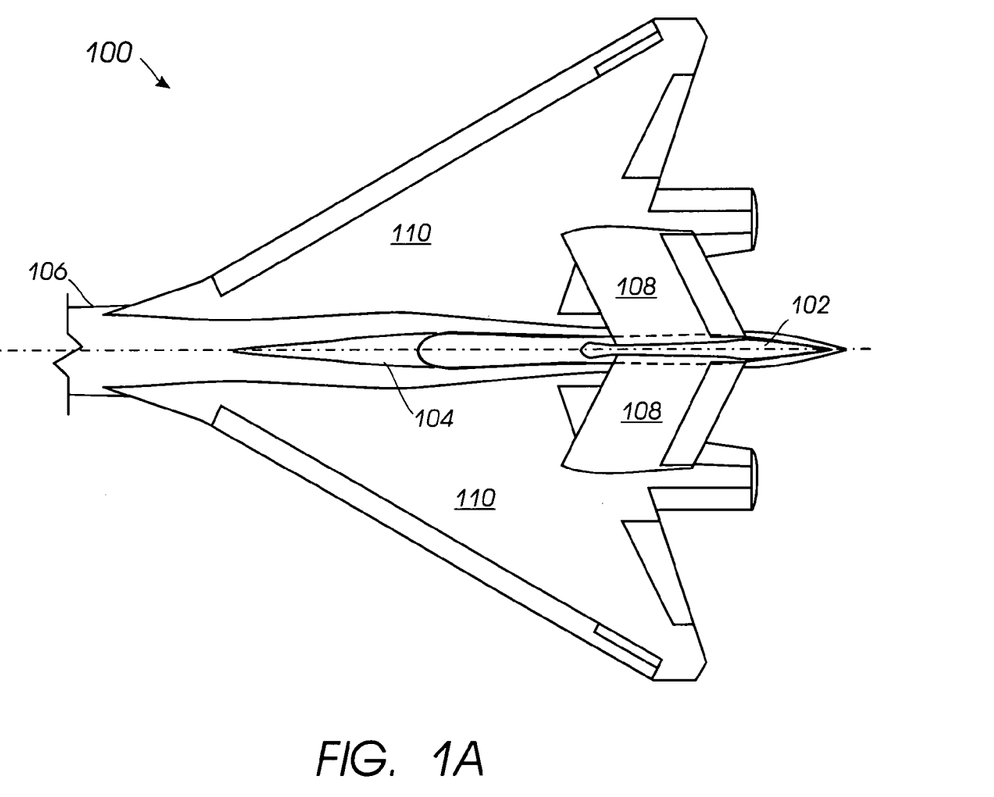
FIG. 1A is a top view of an embodiment of a rear portion of an aircraft including an area ruled vertical fin extending from a strake.
Figure 1B:
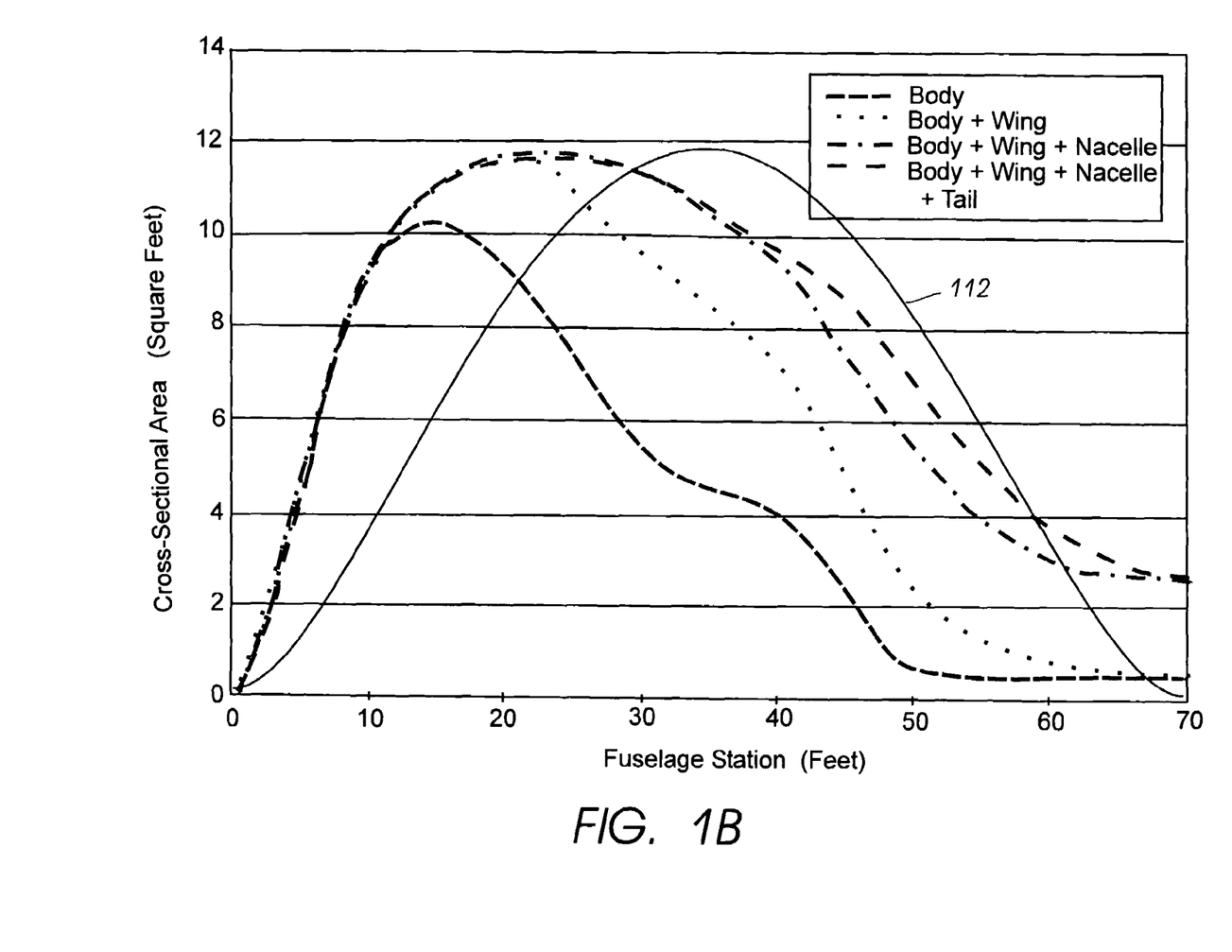
FIG. 1B shows the difference in cross-sectional area distribution for components of an example of an aircraft body versus the ideal Sears-Haack conceptual body shape for minimizing wave drag.

To reduce the wave drag due to change in cross-sectional area distribution, the area must follow a smooth bell curve shape known as a Sears-Haack curve 112 shown in FIG. 1B. FIG. 1B also shows the difference in cross-sectional area distribution for components of an example of an aircraft body versus the Sears-Haack conceptual body shape. The closer the cross-sectional area distribution of an aircraft comes to the ideal Sears-Haack curve 112, the lower the wave drag. A smooth overall vehicle cross-sectional area distribution in the vicinity of wing 110, vertical fin 102 and inverted V-tail 108 can be more significant in reducing wave drag than a smooth fuselage area.

Figure 1C:
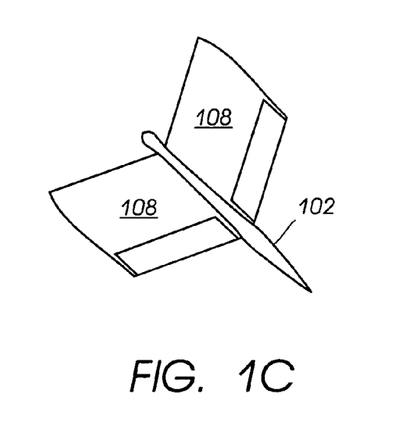
FIG. 1C is a top view of the tip of the area ruled vertical fin of FIG. 1A coupled to the inverted V-tail.

FIG. 1C is a top view of the tip of vertical fin 102 of FIG. 1A coupled to inverted V-tail 108. The area ruling of the tip of vertical fin 102 reduces the cross-sectional area of vertical fin 102 in the vicinity of inverted V-tail 108, as well as the rate of change of the cross-sectional area distribution. In some embodiments, the area ruling is only applied to vertical fin 102 at the juncture of inverted V-tail 108. In other embodiments, the area ruling can extend all or part of the distance between the root and the tip of vertical fin 102.

Figure 1D:
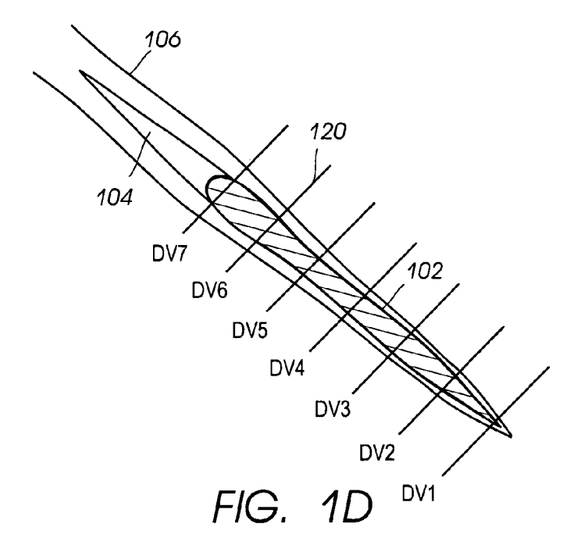
FIG. 1D is a top view of a cross-section of the root of the vertical fin of FIG. 1A mounted at the tip of the strake of FIG. 1A.
Figure 1E:
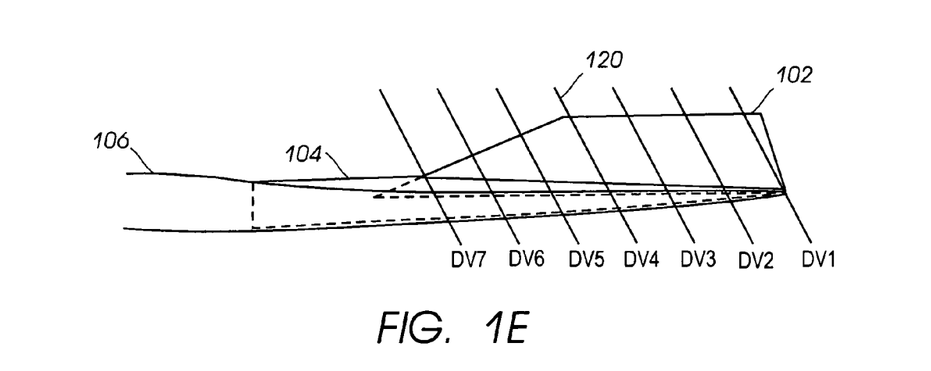
FIG. 1E is a side view of the rear portion of the aircraft with the vertical fin and strake of FIG. 1A.

FIG. 1D is a top view of the root of vertical fin 102 at a juncture with the tip of strake 104 of FIG. 1A. FIG. 1E is a side view of vertical fin 102 and strake 104 of FIG. 1A with respect to fuselage portion 106. Strake 104 includes an upper portion above fuselage 106 that is exposed to the airstream, and a lower portion that is mounted within fuselage 106 that carries loads from vertical fin 102 and inverted V-tail 108. Strake 104 improves aircraft fuselage stiffness, enables a desired reduction in fuselage volume, and compensates for any reduction in stiffness that results from the reduced area fuselage.

In some embodiments, both the root of vertical fin 102 and the upper portion of strake 104 are shaped to reduce the cross-sectional area of aircraft 100, as well as the rate of change of the cross-sectional area distribution. In other embodiments, either vertical fin 102 or the upper portion of strake 104 is configured to help aircraft 100 achieve a shape that corresponds as closely to Sears-Haack curve 112 (FIG. 1B) as possible.

Figure 1F:
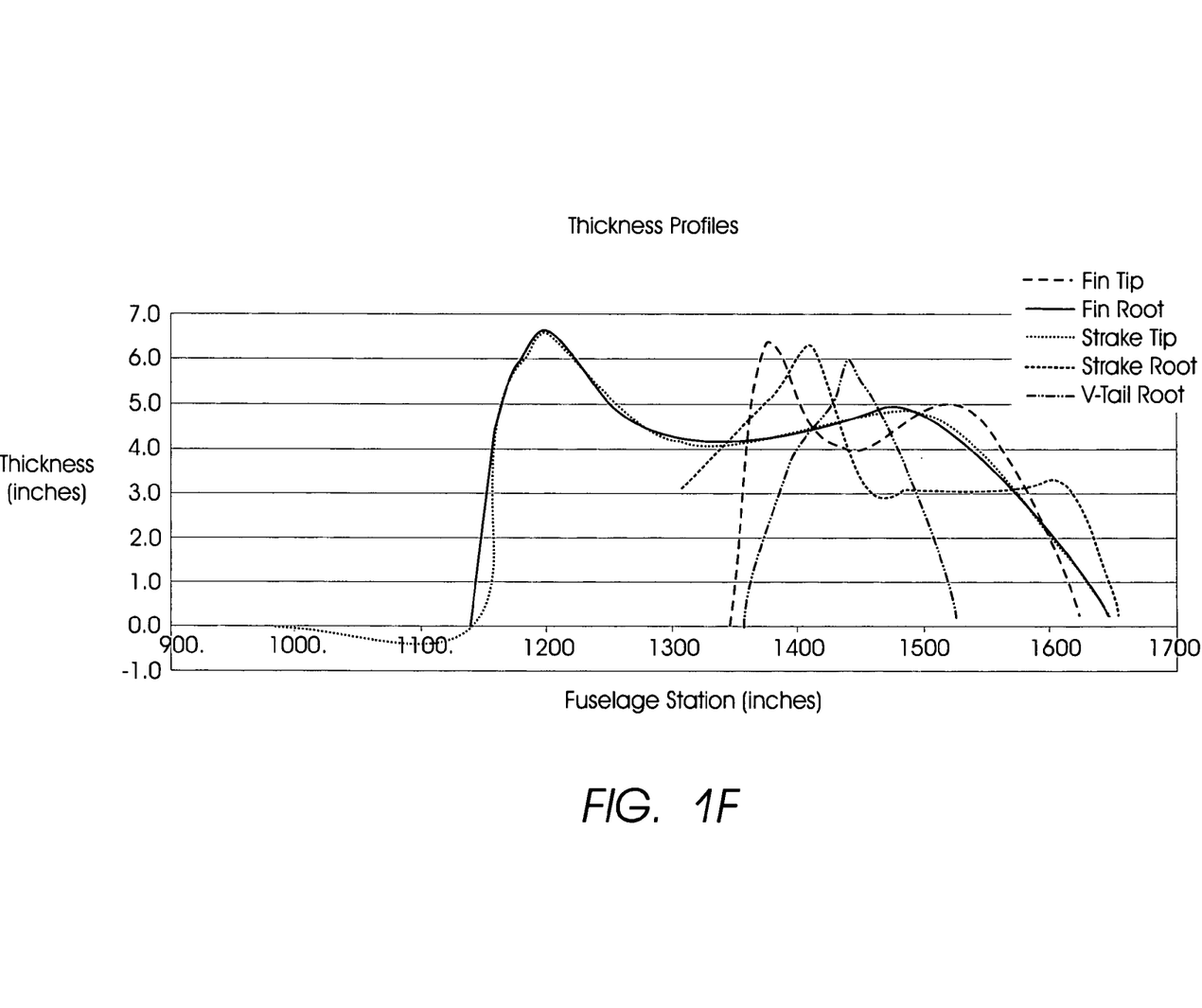
FIG. 1F is a graph showing thickness profiles for an embodiment of the vertical fin and dorsal fuselage portion of FIG. 1A.

Referring to FIGS. 1A and 1F, FIG. 1F is a graph of thickness profiles for embodiments of tip and root cross-sections of vertical fin 102, strake 104, and the root of V-tail 108 at the juncture with the tip of vertical fin 102, along stations of fuselage 106. The thickness profile of the root of vertical fin 102 corresponds approximately to the shape of the tip of strake 104. Note that the thickness profiles represent the thickness of the entire component.

Figure 2A:
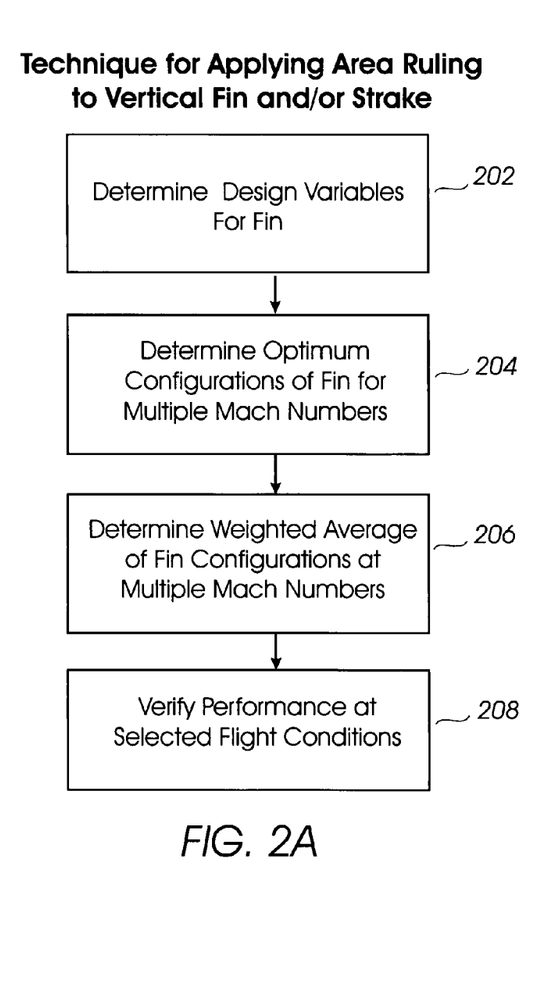
FIG. 2A is a flow diagram of an embodiment of a method for configuring the area rule shape for the vertical fin and strake of FIG. 1A.

FIG. 2A is a flow diagram of an embodiment of a method for configuring the area rule shape for an aircraft including vertical fin 102 and/or strake 104 of FIG. 1A. Process 202 includes determining design variables (DVs) to use to optimize a specified figure of merit, such as minimizing wave drag and/or sonic boom disturbance. Each design variable can be a single value, or a range of values for one or more parameters.

FIGS. 1D and 1E show an example of locations of design variables DV1-DV7 that can be used to determine an optimum configuration for vertical fin 102 and strake 104. In some embodiments, design variables DV1-DV7 are utilized to perform area rule optimization on the shape of vertical fin 102 and/or strake 104. The optimization can be performed on individual components, or combinations of vertical fin 102, strake 104, fuselage 106, inverted V-tail 108, and/or wing 110. Additional design variables can be used in certain analysis methods, such as computational fluid dynamics (CFD), to simultaneously determine optimum configurations for a combination of vertical fin 102, strake 104, fuselage 106, inverted V-tail 108, and wing 110. Further, any suitable number and location of design variables can be used to configure vertical fin 102, strake 104, and inverted V-tail 108, depending on the geometry of a specific configuration. In some instances, constraints are specified to maintain maximum possible thickness of vertical fin 102 for structural support considerations while still achieving minimum drag and zero closure angle at the trailing edge of vertical fin 102.

The design variables are typically optimized along Mach angle lines 120, which vary according to the Mach number. Thus, an optimum configuration for the components such as vertical fin 102, strake 104, and inverted V-tail 108 can vary between Mach numbers.

To shape vertical fin 102, strake 104, and inverted V-tail 108 for minimum drag, parameters such as thickness, height, and width can be used to minimize cross-sectional area, as well as the change (first derivative) of cross-sectional area distribution, and rate of change (second derivative) of cross-sectional area distribution. A combination of thicknesses and n-order derivatives can also be used as design variables in orthogonal functions such as Fourier series and Legendre polynomial functions, as well as non-orthogonal functions such as Taylor series. Use of first and second order derivatives as design variables typically achieves smoother shapes than just using cross-sectional area and thickness alone.

As an example, the following Table 1 shows examples of first derivative variables and equations that can be specified for the design variables:

TABLE 1

| Design Variable | Axial Location | First Derivative of thickness | thickness |
|---|---|---|---|
| DV1 | $X_1$ | $t'_1$ | 0 |
| DV2 | $X_2$ | $t'_2$ | $t_1 = c_1 * t'_1 * (X_2 - X_1)$ |
| ... | ... | ... | ... |
| DV(n − 1) | $X_{n-1}$ | $t'_1$ | $t_{n-1} = t_{n-2} + c_{n-1} * t'_{n-1} * (X_{n-1} - X_{n-2})$ |
| DVN | $X_n$ | $t'_1$ | $t_n = t_{n-1} + c_n * t'_n * (X_n - X_{n-1})$ |

The coefficients $C_n$ through $C_n$ can be adjusted to match the maximum thickness constraints as well as achieve trailing edge thickness, $t_n$, of zero.

Figure 2B:
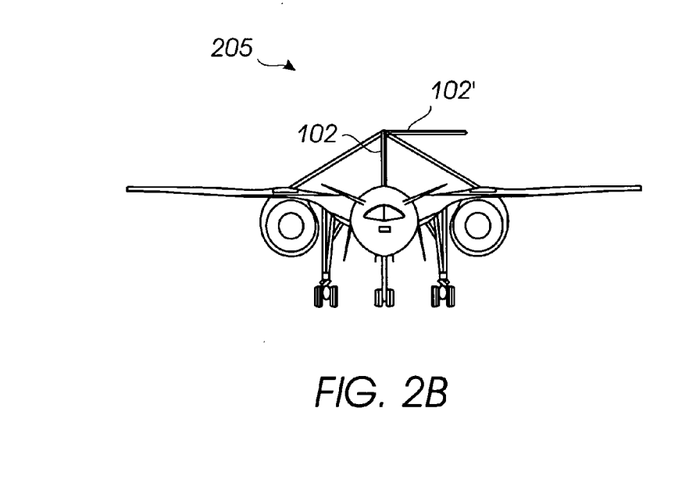
FIG. 2B is a diagram of the vertical fin reflected above the inverted V-tail of FIG. 1A.

Referring to FIGS. 2A-2B, process 204 includes adjusting various parameters and constraints to determine optimum configurations of vertical fin 102, strake 104, and inverted V-tail 108 for minimum drag at different Mach numbers. A single configuration typically will not be optimal for all flight conditions. In some situations, a designer is able to segregate portions of an aircraft's flight regime into distinct phases during which the aircraft can be reconfigured to achieve an optimum result for a given flight segment. For example, while it is desirable to reduce sonic boom disturbances over land, louder sonic booms can be tolerated over an ocean or large unpopulated land mass. Sonic boom constraints are easier to meet at slower speed, such as 1.5 Mach, versus 1.8 Mach for supersonic cruise.

Accordingly, a designer can determine a first configuration that meets sonic boom constraints during climb and cruise flight over land, another configuration that optimizes range during cruise flight over unpopulated areas with relaxed sonic boom constraints, as well as other configurations that optimize specified parameters during a particular flight segment at different Mach numbers. Process 204 can also be used to help determine optimum configurations for takeoff, climb, and landing modes, based on the constraints to be met for each flight mode. The design variables are typically selected along Mach angle lines 302, which vary according to the Mach number. Thus, an optimum configuration for aircraft 300 can vary between Mach numbers.

In some embodiments, process 204 utilizes linear theory techniques to analyze shapes that minimize the first and second rates of change of the cross-sectional area distribution to optimize the configuration of aircraft 205 for low drag. Another consideration in determining the shape of vertical fin 102 is that structural constraints generally require a minimum thickness between the sides of vertical fin 102, typically over a specified percentage of the distance from the leading edge to the trailing edge of the vertical fin 102. The term "chord", denoted by "c", refers to a straight line from the leading edge to the trailing edge of an airfoil. The structural requirements can be specified as a minimum closure angle θ at the trailing edge of vertical fin 102 that will result in the desired thickness d at the specified distance along chord c, such as 80 percent of the chord (0.8c).

An example of a suitable linear theory software program than can be used in process 204 is AWAVE, which was developed by NASA Langley. AWAVE determines fuselage cross sections which yield minimum wave drag by enforcing the supersonic area rule. Three-dimensional aircraft component definitions, such as wing, fuselage, nacelle and empennage are input into the program. Then, the far-field wave drag of the configuration is analyzed based on the equivalent bodies of those components, producing an optimum fuselage cross section distribution along its axis for design Mach numbers larger than 1.0. Once candidate configurations are identified, more complex non-linear computational fluid dynamic methods can be employed to further refine the configurations.

Process 204 can also utilize the Method of Reflections of linear fluid flow theory to analyze the drag characteristics of inverted V-tail 108 and vertical fin 102. In applying the Method of Reflections to aircraft 205, a virtual image of vertical fin 102 is "reflected" on the other side of inverted V-tail 108 as shown in FIG. 2B by reflected fin 102'. The Method of Reflections is used to model flow trapped in a channel formed between vertical fin 102 and inverted V-tail 108 by simulating a symmetry boundary condition in which a degree of freedom is removed from the flowfield. In some embodiments, the aircraft configuration is optimized for Mach numbers that are close to transonic conditions in order to avoid choking the flow in the channel formed between vertical fin 102 and inverted V-tail 108. The Method of Reflections can also be used to determine optimum configurations for vertical fins 102 configured with other stabilizing surfaces such as horizontal stabilizers, in addition to, or instead of, inverted V-tail 108.

With respect to area ruling, an optimum shape at one near-transonic Mach number generally will have more "waist" than shapes optimized for a higher Mach number. Process 206 includes weighting each configuration with a factor, summing the weighted values, and taking the average of the weighted values to configure aircraft 205 to operate efficiently over expected flight conditions, such as takeoff, climb, low boom climb and cruise, high speed cruise, and landing. The weighting factors can be based on any suitable constraint(s) or criteria, such as percent of typical flight profile, the difference between thrust available and thrust required (referred to as pinch-point), minimum drag, or minimum sonic boom, for example. In one embodiment, configurations are determined at Mach 1.2, 1.3, and 1.8. The configurations are weighted ½ on Mach 1.3, and ¼ on Mach 1.2 and 1.8. Mach numbers that are closer to transonic conditions can be weighted more heavily to avoid choking the flow in the channel formed between vertical fin 102 and inverted V-tail 108. Configurations at other suitable Mach numbers and combination of weighting factors can be utilized.

The performance of the Mach-weighted configuration resulting from process 206 is analyzed in process 208. In the early stages of a new aircraft design, several configurations may be analyzed to determine the best tradeoff between often-competing goals. Thus, in some embodiments, process 208 can perform linear analysis to evaluate multiple candidates. In the later design stages, however, process 208 can utilize non-linear techniques, which are computationally much more intensive, but provide more accurate results than linear techniques.

Figure 3A:
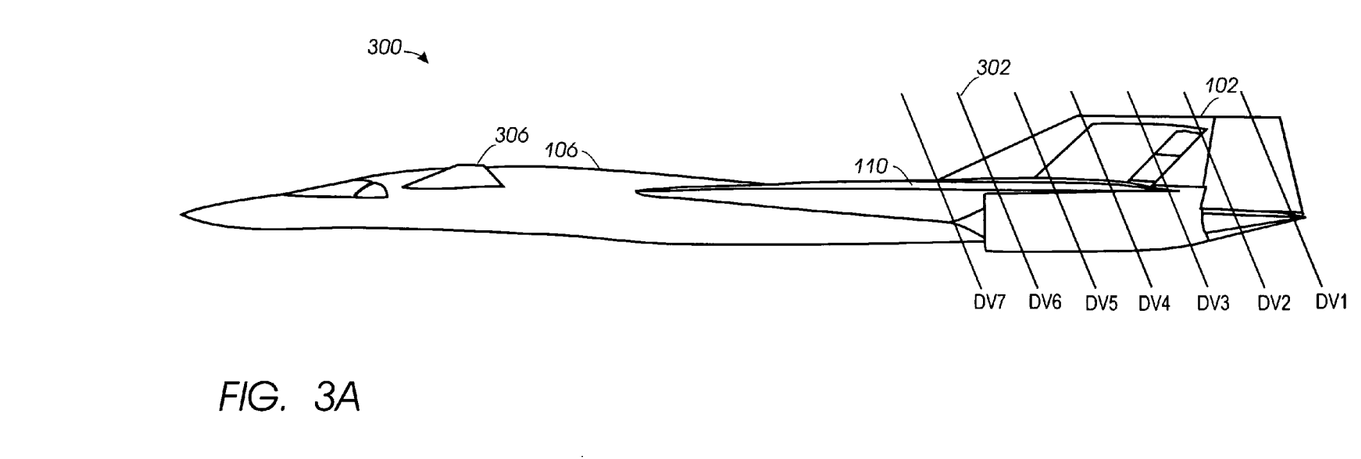
FIGS. 3A through 3C are side, front, and top views, respectively, of an embodiment of an aircraft that can utilize the area ruled vertical fin and dorsal fuselage portion of FIG. 1A.
Figure 3B:
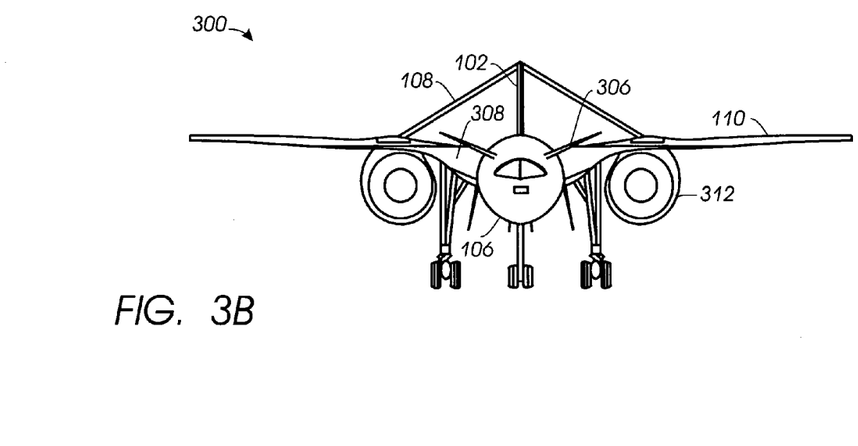
Figure 3C:
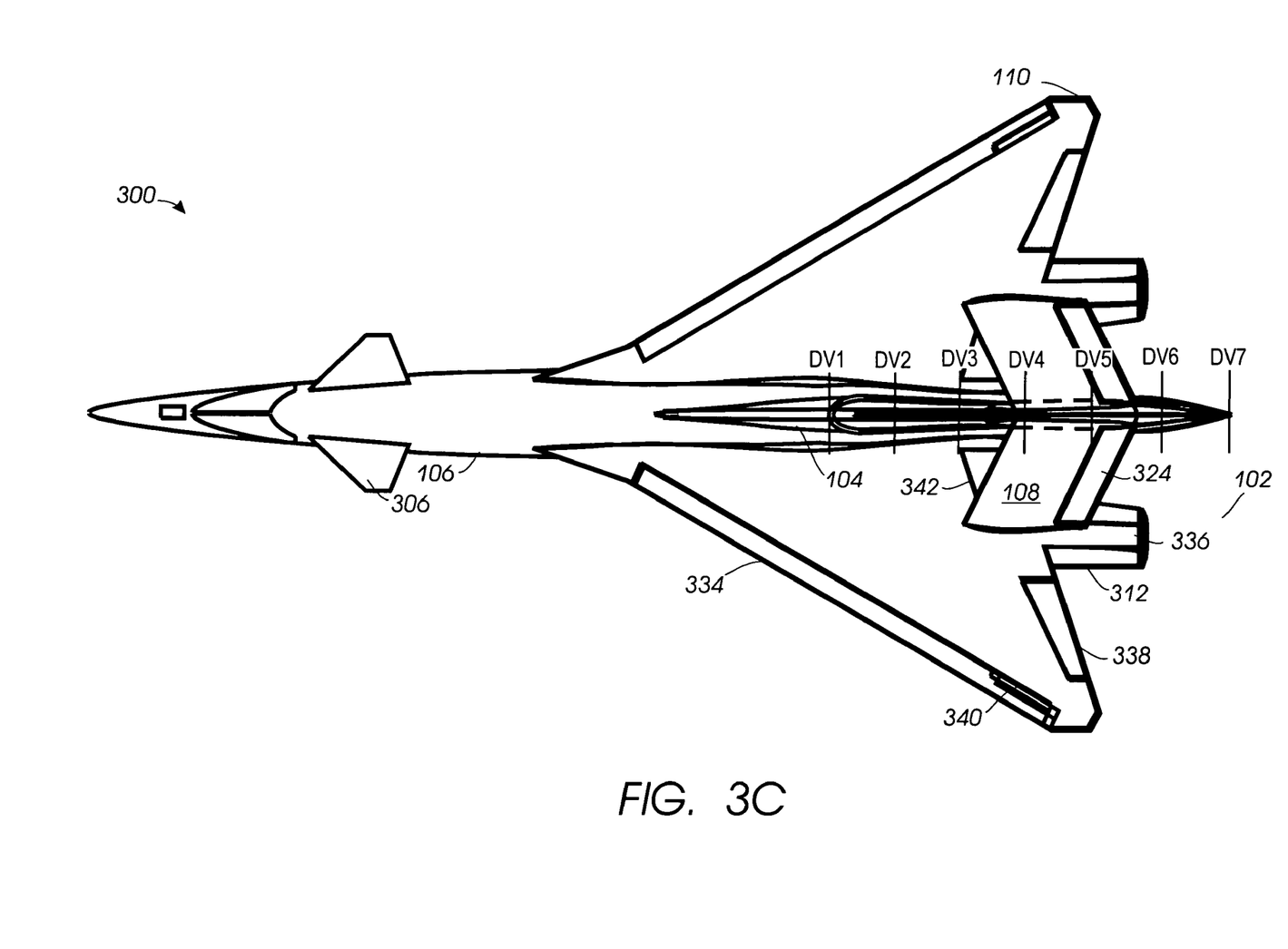

Referring to FIGS. 3A through 3C, an embodiment of aircraft 300 shown is configured with area ruled vertical fin 102 and strake 104 of FIG. 1A for reduced drag and improved performance characteristics. Wings 110 includes gull dihedral portions 308 with inboard dihedral primarily at the trailing edges while maintaining straight inboard wing sections forward of the trailing edge dihedral. Gull dihedral portions 308 are configured to extend lifting length and reduce sonic boom effects. Gull dihedral portions 308 can be configured by adjusting the twist and camber of wings 110 to produce low-boom and low induced drag.

In some examples, aircraft 300 has twin non-afterburning turbofan engines (not shown) set below and behind wings 110. The non-afterburning turbofan engines operate behind fixed-geometry axisymmetric external compression inlets. Nacelles 312 enclose the engines and are coupled to the lower surface of wings 110.

Inverted V-tail 108 generates additional aft lift to improve aerodynamics and reduce sonic boom disturbances during cruise flight conditions, as well as providing structural support for wings 110 and engine nacelles 312. Supersonic aircraft 300 creates a shaped pressure wave caused by overpressure at nose 304 and underpressure at tail 306. Pressure rises rapidly at nose 304, declines to an underpressure condition at tail 306, and then returns to ambient pressure.

The shape of supersonic aircraft 300, including aspects of wing 110, V-tail 108, and a reflexed airfoil portion (not shown) integrated with engine nacelle 312, are adapted according to sonic boom signature and supersonic cruise drag considerations. In some embodiments, a portion of nose 304 can be blunted to create a pressure spike ahead of the aircraft forward shock, which raises local temperature and sound velocity, thereby extending the forward shock and slowing the pressure rise. Wings 110 can have a sharply swept delta configuration that reduces peak overpressure by spreading wing lift along the length of aircraft 300. Wings 110 can also include reduced leading and trailing edge sweeps. Inverted V-tail control surfaces, termed ruddervators 324, adjust aircraft longitudinal lift distribution throughout the flight envelope to maintain a low boom, low drag trim condition.

In some embodiments, the leading edges of wings 110 have a substantially straight geometry to accommodate Krueger flaps 334 that extend substantially the full length of wings 110. Wings 110 integrate with nacelles 312 and diverters 336, and follow the fuselage contour with a substantially normal intersection to reduce interference drag. An inboard wing flap hinge line is fully contained within the wing contour with upper and lower wing surfaces configured as planar as possible to facilitate aerodynamic performance.

Gull dihedral portions 308 raise the engines to increase available tip-back angle and reduce thrust-induced pitching moments. Gull dihedral portions 312 lower fuselage 106 to reduce the cabin door height above the ground and reduce entry stair length. Fuselage 106 sets a low aircraft center of gravity, reducing tip-over angle and promoting ground stability. Gull dihedral portions 308 form partial shrouds around nacelles 312, enhancing favorable interaction between nacelles 312 and wings 110. In addition, gull dihedral portions 308 enhance the aircraft low-boom signature by vertically staggering the longitudinal lift distribution of wings 110.

In some embodiments, supersonic aircraft 300 can include canards 306 on both sides of fuselage 106 that operate primarily as longitudinal power control devices, particularly during takeoff and high-speed flight. Canards 306 also fine tune the aircraft longitudinal trim condition and augment rudder operation by supplying yaw control power when canards 306 are deflected differentially.

Supersonic aircraft 300 further includes segmented ailerons 338 that supply roll control power and automatic wing camber control to improve lift and drag conditions through the flight envelope. High-speed spoilers 340 supplement aileron roll power at transonic and supersonic speeds where Mach and aeroelastic effects reduce aileron effectiveness. Supersonic aircraft 300 has a high lift system including inboard trailing edge flaps 342 and full-wingspan leading edge Krueger flaps 334.

Canards 306 and symmetric defections of the ruddervators 324 control pitch power. Rudder 350 controls yaw. Inboard, mid-board and outboard ailerons 348, and high speed spoilers 340 control roll at both subsonic and supersonic speeds. In an illustrative embodiment, trailing edge (TE) flaps 342 are deployed 30° down to generate additional lift during landing. TE flap deployment reduces angle-of-attack by approximately 2° during landing. During a subsequent segment of the climb, the TE flaps 332 can be extended up to 40° to improve the lift-to-drag ratio for better performance.

Leading edge (LE) Krueger flaps 334 can be extended up to 130° for low speed operations including takeoff, approach and landing. The LE Krueger flaps 334 can improve lift-to-drag ratio by 1.5, resulting in better climb performance that facilitates second-segment climb in case of engine malfunction.

Some of the control surfaces on supersonic aircraft 300 can perform multiple functions. For example, ruddervators 332 enable continued operation and landing following single actuator failure or jammed control surface. Differential deflection of canards 306 can generate a yawing moment to counter a jammed rudder 350. Ailerons 338 and ruddervators 324 include multiple surfaces, increasing fault tolerant capability and supplying redundant control elements for improved reliability.

Figure 4:
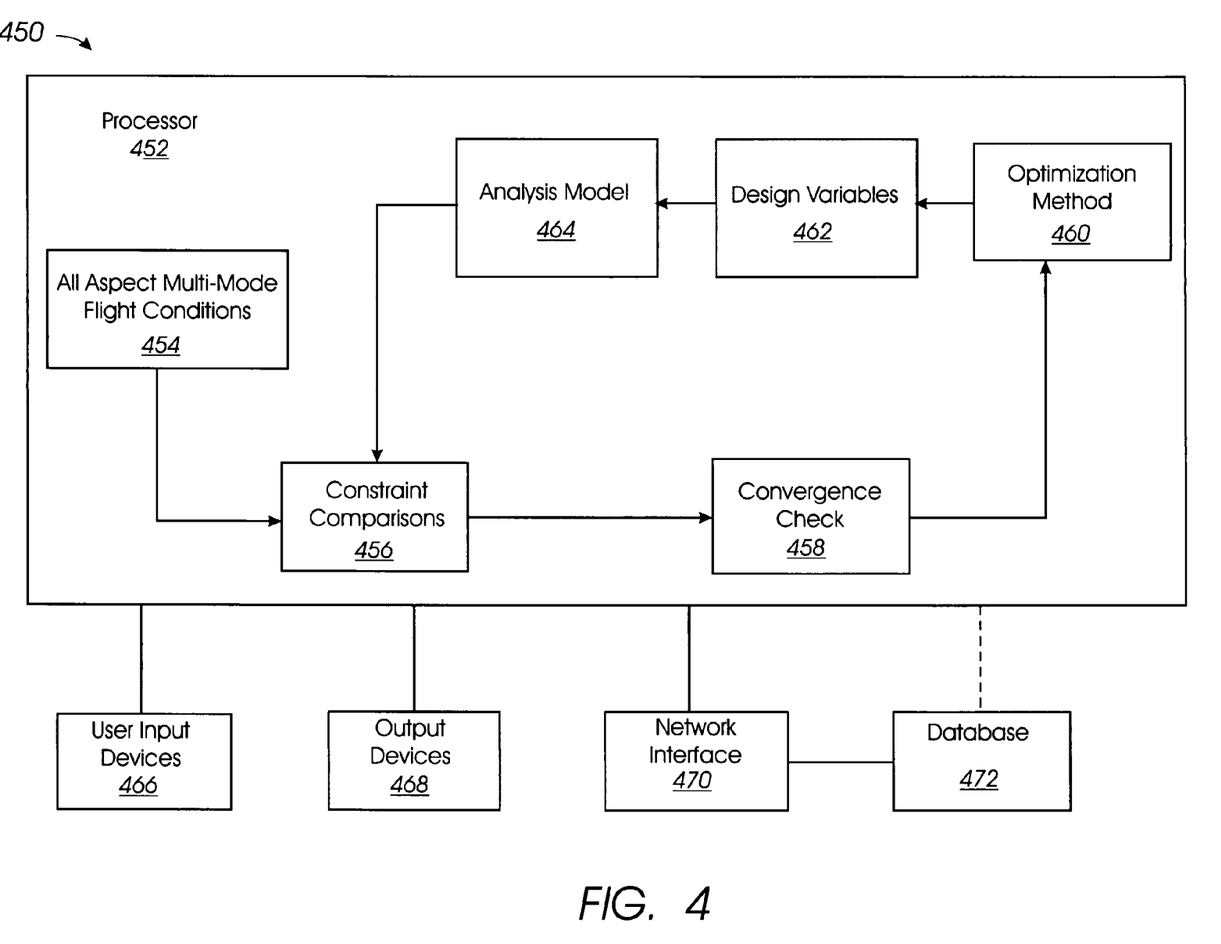
FIG. 4 is a block diagram of an embodiment of a design system for configuring the area rule shape for the vertical fin and dorsal fuselage portion of FIG. 1A.

Referring to FIGS. 2 and 4, FIG. 4 is a block diagram of an embodiment of an aircraft design system 450 for configuring the area rule shape for vertical fin 102 and/or strake 104 of FIG. 1A. Aircraft design system 450 includes logic instructions that implement at least some of functions of processes 202 through 208 in FIG. 2A.

Logic instructions are executed in computer processor 452 for various functions such as input all aspect, multi-point goals and constraints instructions 454; constraint comparison instructions 456; convergence check instructions 458; optimization method 460; set design variables instructions; and analysis model 464. Note that in other embodiments, additional sets of instructions can be performed by computer processor 452 in addition to, or instead of, instructions shown in FIG. 4.

Input all aspect, multi-point goals and constraints instructions 454 receives input from users regarding the different flight modes at which the aircraft configuration will be optimized. For example, modes such as takeoff, climb, low sonic boom mode at Mach 1.5, and high speed cruise mode at Mach 1.8 can be entered for analysis. The results of system 450 can include different settings for control surfaces and other reconfigurable aspects of the aircraft, as well as optimize the shape of fixed components such as wing camber; fuselage shape; wing, strake, and vertical fin shape; and engine nacelle position and shape, among others. In addition to various flight modes, the user may also enter different aspect angles at which to analyze and optimize the aircraft's configuration. For example, while a particular aircraft configuration may meet low sonic boom goals directly under the aircraft during flight, the sonic boom disturbance generated to the sides of the aircraft may be objectionable. Therefore, the user can enter different flight modes as well as the distance/angle from centerline at which the sonic boom disturbance will be analyzed to determine the aircraft's configuration during various flight modes.

Constraint comparison instructions 456 receives input from all aspect, multi-point goals and constraints instructions 254 and analysis model 464. The geometry and performance of one or more configurations is compared to the constraints, such as lift to drag ratio, sonic boom, and geometry constraints. Convergence check instructions 458 receive the constraint comparisons and determine whether a solution has converged to meet all of the desired constraints. If all the constraints have not been met, optimization method 460 is invoked.

Optimization method 460 proceeds through iterative changes to the geometry and perturbations that, for example, optimize a defined cost function (e.g. drag) while satisfying geometric and aerodynamic constraints (e.g. fuel volume, cruise lift coefficient). Configurations can be optimized for single or multiple conditions. Target pressure distributions can be specified for inverse design, or as a constraint during optimization of other performance drivers. Any suitable optimization method can be utilized, including one or a combination of methods.

Set design variables instructions 462 allow the user to specify locations on the aircraft's geometry, parameters at each location, and perturbation values for each parameter. The perturbations values can be single values, or a range of values, for each parameter.

Analysis model 464 performs linear and/or computational fluid analysis (CFD) on candidate configurations and provides performance results to constraint comparison instructions 456. Any suitable analysis program or set of programs can be utilized. The complete iterative design process for performance optimization, geometry shaping and CFD analysis may be automated.

The logic instructions can be implemented as software programs and distributed over an information network or suitable computer-readable media as a software application program that can be installed on a personal computer, a centralized server, or other suitable computer system. The logic instructions can also be implemented in hardware, firmware, and/or a combination of hardware, firmware and software. One or more user input devices 466 can be provided, such as a keyboard, mouse, light pen, or a component such as a disk drive that can read data input files from a disk, to enable a designer to enter suitable constraints and design parameters. One or more output devices 468 such as a display device, printer, plotter, or other suitable output device can be coupled to receive information from processor 452. A user interface can also be included that provides instructions for using system 450, possible design parameters that can be varied, as well as assistance in interpreting the results. The results can be formatted and output for use in other design systems, such as computer-aided design and drawing systems via network interface 470, to easily share the results of the design effort. Processor 452 can be configured to access a database 472 either directly or via network interface 470 for mass data storage and retrieval.

In addition to providing systems and methods for configuring aircraft with area ruling to minimize drag, system 450 and processes 202 through 208 can be adapted to apply area ruling to the shape of any type of apparatus that includes surfaces subject to some sort of flow. For example, aquatic vehicles used on the surface and/or underneath water can be analyzed and configured to minimize cross-sectional area as well as first and second order rates of change in cross sectional area distribution to reduce wave drag. Additionally, embodiments of the systems and methods disclosed herein can be configured to apply to T-tails as well as inverted V-tails on aircraft and other vehicles.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed is:

1. A method for incorporating area ruled surfaces in a supersonic aircraft, the method comprising:
specifying design constraints in an automated analysis system to minimize the change (first derivative) of cross-sectional area distribution, and rate of change (second derivative) of cross-sectional area distribution of the aircraft; and
reflecting a vertical tail fin about an inverted V-tail coupled to the vertical tail fin to simulate a symmetry boundary condition in which a degree of freedom is removed from the flowfield in order to represent the inverted V-tail channel during automated analysis.

2. The method of claim 1 further comprising:
specifying design constraints in an automated analysis system to maintain maximum possible thickness of a vertical fin at a given location for structural support while achieving minimum drag and zero closure angle at the trailing edge of vertical fin.

3. The method of claim 1 further comprising:
optimizing the shape of the aircraft for Mach numbers that are close to transonic conditions in order to avoid choked flow in a channel formed between the vertical tail fin and the inverted V-tail.

4. The method of claim 1 further comprising:
determining a first optimum aircraft configuration for the "waisted" area of the vertical fin and aircraft fuselage along Mach angle lines at a first Mach number;
determining a second optimum aircraft configuration for the "waisted" area of the vertical fin and aircraft fuselage along Mach angle lines at a second Mach number;
weighting the first and second optimal aircraft configurations to form weighted configurations; and
averaging the weighted configurations to determine a final configuration.

5. The method of claim 1 further comprising:
determining a first optimum aircraft vertical tail configuration using a weighted combination of thicknesses and n-order derivatives as design variables in orthogonal functions and non-orthogonal functions.

6. The method according to claim 4 further comprising:
determining weighting factors for the first and second optimum configurations based on a percentage of time the aircraft is expected to fly at each Mach number during typical flight profiles.

7. The method according to claim 4 further comprising:
determining weighting factors for the first and second Mach numbers based on at least one of the group of: minimized drag and minimized sonic boom disturbance.

8. The method according to claim 1 further comprising:
optimizing the cross-sectional area distribution along Mach angle lines of a given azimuth.

9. The method according to claim 2, further comprising:
determining weighting coefficients for design variables to maintain thickness/trailing-edge closure constraints for the vertical fin.

10. The method according to claim 2, further comprising:
determining the weighting coefficients for nth order derivatives with or without orthogonal functions to represent respective thickness variables.

11. The method according to claim 2, wherein the stabilizing surface is an inverted V-tail, the method further comprising:
determining weighting factors based on avoiding choked flow conditions between the vertical fin and the stabilizing surface.

* * * * *